Dec. 13, 1960   E. W. HOLMES ET AL   2,964,288
VALVES

Filed April 22, 1957   2 Sheets-Sheet 2

Inventors
Edward William Holmes
George William Francis Richards
By
Dowell & Dowell
Attorneys United States Patent Office 2,964,288
Patented Dec. 13, 1960

2,964,288

VALVES

Edward William Holmes, Manor Cottage, Doddinghurst, and George William Francis Richards, 33 Fontayne Ave., Chigwell, England Filed Apr. 22, 1957, Ser. No. 654,128

Claims priority, application Great Britain Apr. 23, 1956

2 Claims. (Cl. 251—126)

This invention relates to metering valves.

It is particularly concerned with fuel supply control valves in portable oil heating stoves having vaporising burners.

In such stoves, it is usual for the oil to be fed to the burner from a tank by gravity. It is essential therefore that a cut-off valve be provided. It is also desirable that means be provided to allow the rate of supply of oil to the burner to be adjusted in accordance with changes in the supply head. The permissible change in rate of supply if proper vaporisation and burning are to be ensured is very small. On the other hand, the possible variations in liquid level in the tank can be very appreciable. The unevenness of the floor on which a stove is placed can be a factor in this connection.

One way of maintaining the rate of supply constant is to install a float-controlled supply control valve. Such valves, however, are expensive and their provision involves an undesirable complication.

The metering valve in accordance with the invention comprises an internally cylindrical valve body having an inlet and an outlet spaced apart from each other along its length; in a screwthread in the cylinder on the side of the outlet remote from the inlet there is engaged a spindle which is thus displaceable along the length of the cylinder; the cylinder is provided with a seating on which the spindle can be seated to close the inlet and has a helical groove which extends from near the seating as far as and preferably to beyond the outlet; the spindle is a good fit in the grooved portion of the cylinder between inlet and outlet so that when the spindle is unseated, the liquid path from inlet to outlet includes a length of the groove which length depends upon the axial position of the spindle in the cylinder.

The helical groove offers a resistance to the flow of liquid through it which varies in accordance with its effective length. Control of the rate of flow through the valve body can therefore be effected by adjustment of the axial setting of the spindle and consequent variation in the effective length of the groove.

Preferably, the helical groove is in the form of a screwthread which can be an extension of that provided for adjustment of the position of the spindle in the valve body. The screwthread can be of V or of square cross-section. In the preferred form of the invention, the groove is in the form of V screwthread having a flattened crest. The advantage of this will be explained further on.

The seating and the cooperating end of the spindle form a cut-off valve. Preferably, the seating is formed of a material such as polyethylene which has a slight amount of elastic flexibility or "give."

An example of a metering valve in accordance with the invention is shown in the accompanying drawings, in which:

Figures 3 and 4 are views corresponding to Figure 2 showing the valve in the cut-off and fully open positions.

Figure 1:
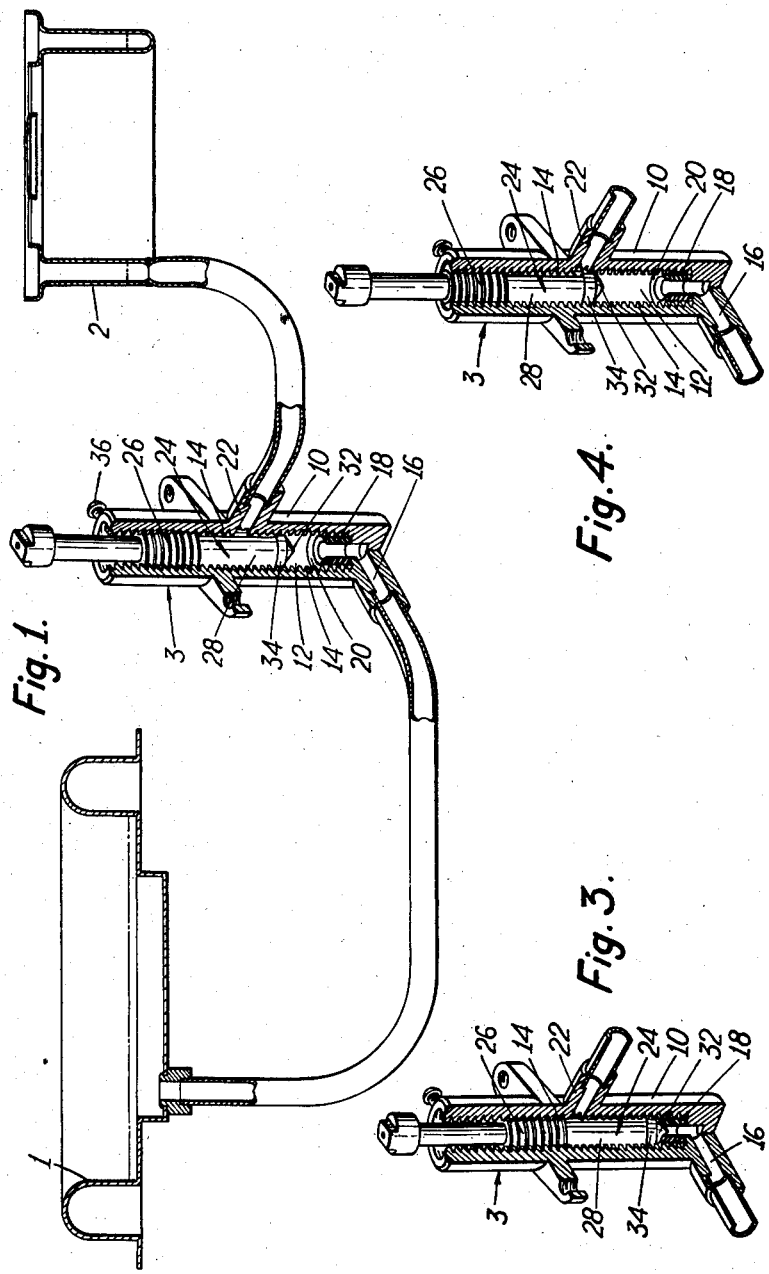
Figure 1 shows diagrammatically a typical fuel supply system for a vaporising oil burner in which the metering valve is incorporated.

Figure 1 shows a fuel supply reservoir 1 connected to a vaporising burner 2 through a valve 3 by means of which the supply of fuel (kerosene) can be completely cut off or be adjusted to any desired rate.

Figure 2:
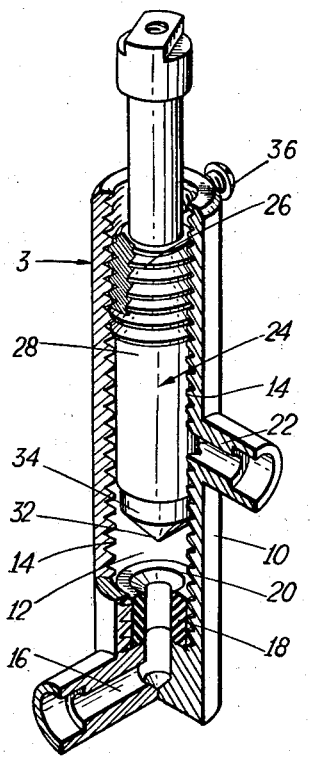
Figure 2 is an enlargement of part of the valve shown in Figure 1.

The valve 3 comprises a valve body 10 having a cylindrical bore 12 which is screwthreaded over its whole length. The screwthread 14 has a pitch of say 12 threads to the inch. Its threads are of ordinary V-section except that their crests are flattened as can be seen in Figures 2–4.

At the bottom end, the valve body has an inlet 16 for the fuel from the reservoir 1 and is provided with an insert 18 of polyethylene formed with a conical valve seating surface 20. At an intermediate point in its length, the valve body has a lateral outlet 22.

Engaged in the screwthreaded bore of the valve body is a spindle 24 having a screwthread 26 of ordinary V-section.

The part 28 of the spindle immediately beyond the screwthreaded part has a plain cylindrical surface which is accurately machined to the diameter of the flattened crests of the screwthread 14.

At its extreme lower end, the spindle terminates in a conical point 32 which can be seated on the seating 20 to close the inlet as shown in Figure 3.

Immediately above the point 32, the diameter of the spindle is slightly reduced as shown at 34.

Figures 1 and 2 show the valve in a typical ordinary setting. Liquid from the reservoir 1 flows by gravity through the inlet 16 into the valve body and out through the outlet 22. To do that, it has to pass through the helical passage defined by the screwthread 14 and that part of the plain surface 28 of the spindle which is below the outlet. The flattened crests of the screwthread ensure that the liquid is unable to take a short path to the outlet but must follow the helical path the length of which determines the resistance to flow and, therefore, the rate of flow under a given head.

By raising the spindle, the length of the flow path is shortened and the rate of flow increased. Figure 4 shows the spindle raised so that the helical path is entirely eliminated. That is the position of maximum rate of flow.

On the other hand, lowering the spindle lengthens the flow path and decreases the rate of flow.

Very accurate adjustment of the rate of flow is possible. In a vaporised oil burner, to ensure the most efficient operation, the rate of flow must be adjustable to within less than 1 cc. per hour of a given rate.

The valve described above allows such accurate adjustment to be very easily effected.

The reduction in the diameter of the spindle immediately above the point 32 ensures that flow through the helical passage will start when the cut-off valve is opened, in spite of the small cross-section of that passage.

It will be noted that adjustment of the spindle to increase the rate of flow does not produce a surge of fuel to the burner. If the design were mechanically inverted, the screwthread which forms the fuel path being provided on the spindle instead of on the valve body, movement of the spindle away from the seat would cause fuel to be carried towards the outlet and result in a temporary over-supply to the burner.

To ensure flow from inlet to outlet, it is essential that the possibility of an air lock be eliminated. This is achieved by the flattening of the crest of the thread on the spindle which ensures that there is an air path between the mating threads above the outlet, that path, however, being too constricted to allow fuel to pass through it.

The valve provides accurate and efficient control over the rate of supply of fuel; it also allows the fuel supply to be securely cut-off altogether; it is relatively cheap to manufacture and it is simple to operate.

An important practical advantage of the design shown in the drawings is that there is a single screwthread in the valve body which serves the dual purpose of enabling the valve spindle to be operated and of providing a fuel path of variable resistance.

The valve body and valve spindle are preferably made of brass, the valve body being provided with a flange by means of which it can be fixed to the heater. The valve will normally be set with the axis of the valve spindle vertical.

The valve can be used by the manufacturer to set the combustion rate of a heater semi-permanently, in which case, the spindle would be held in its adjusted position by the screw 36 shown in Figure 1, or it can be adjusted from time to time by the user.

We claim:

1. A metering valve comprising an internally cylindrical body, a screw thread in said body, an axial inlet at one end of said body, a first valve seat surrounding said inlet, a lateral outlet in said body spaced from said inlet, a valve spindle threadedly received in said body through the other end thereof, a second seat at one end of said spindle for cooperation with said first seat, said spindle having an annular recess at its end immediately adjacent said second seat, a smooth cylindrical surface on said spindle fitting closely within said screw thread in said body, said surface extending from said recess at least as far as said outlet when said seats are in engagement with each other to define a helical path between said inlet and said outlet, and means to rotate said spindle to adjust the length of said helical path.

2. A metering valve as claimed in claim 1, wherein said screw thread in said body is of V-shaped section with a flattened crest.

References Cited in the file of this patent

UNITED STATES PATENTS

| | | |
|---|---|---|
| 423,896 | Barker | Mar. 25, 1890 |
| 869,878 | Bruckner | Nov. 5, 1907 |
| 1,754,138 | Agee | Apr. 8, 1930 |
| 1,918,959 | Culp | July 18, 1933 |
| 2,037,994 | Neubauer | Apr. 21, 1936 |
| 2,038,229 | Martin | Apr. 21, 1936 |
| 2,078,567 | Foregger | Apr. 27, 1937 |
| 2,209,442 | Buffington | July 30, 1940 |
| 2,485,423 | Weaver | Oct. 18, 1949 |
| 2,650,455 | Jacobsson | Sept. 1, 1953 |
| 2,797,701 | Nurkiewicz | July 2, 1957 |